(12) United States Patent
Föttinger et al.

(10) Patent No.: US 7,015,169 B2
(45) Date of Patent: Mar. 21, 2006

(54) CATALYST SYSTEMS OF THE ZIEGLER-NATTA TYPE AND THEIR PREPARATION

(75) Inventors: Klaus Föttinger, Mannheim (DE); Martin Schneider, Kelkheim (DE); Rainer Karer, Kaiserslautern (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/499,633

(22) PCT Filed: Dec. 10, 2002

(86) PCT No.: PCT/EP02/13967

§ 371 (c)(1),
(2), (4) Date: Jun. 21, 2004

(87) PCT Pub. No.: WO03/054028

PCT Pub. Date: Jul. 3, 2003

(65) Prior Publication Data

US 2005/0003952 A1    Jan. 6, 2005

(30) Foreign Application Priority Data

Dec. 20, 2001  (DE) ................................ 101 63 075

(51) Int. Cl.
*C08F 4/646* (2006.01)
*C08F 4/649* (2006.01)

(52) U.S. Cl. ...................... 502/110; 502/115; 502/120; 502/128; 502/132; 502/134

(58) Field of Classification Search ............... 502/110, 502/115, 120, 128, 132, 134
See application file for complete search history.

(56) References Cited

U.S. PATENT DOCUMENTS 5,192,731 A * 3/1993 Kioka et al. ................ 502/110
6,521,722 B1 * 2/2003 Bidell et al. .................. 526/88

\* cited by examiner

*Primary Examiner*—Caixia Lu
(74) *Attorney, Agent, or Firm*—Novak Druce & Quigg, LLP

(57) ABSTRACT

The present invention relates to catalyst systems of the Ziegler-Natta type, to a process for preparing them, to their use for the polymerization of olefins and to ethylene copolymers which can be prepared using this catalyst system.

11 Claims, No Drawings

CATALYST SYSTEMS OF THE ZIEGLER-NATTA TYPE AND THEIR PREPARATION

The present invention relates to catalyst systems of the Ziegler-Natta type, to a process for preparing them and to their use for the polymerization of olefins.

Catalyst systems of the Ziegler-Natta type have been known for a long time. These systems are used, in particular, for the polymerization of $C_2$–$C_{10}$-alk-1-enes and, comprise, inter alia, compounds of polyvalent titanium, aluminum halides and/or aluminum alkyls together with a suitable support material. The Ziegler-Natta catalysts are usually prepared in two steps. Firstly, the titanium-containing solid component is prepared. This is subsequently reacted with the cocatalyst. The polymerization is then carried out with the aid of the catalysts obtained in this way.

EP-A-014523 describes a process for preparing Ziegler catalysts, in which an inorganic oxide is reacted with a magnesium alkyl and a halogenating reagent in any order and the resulting intermediate is reacted with a Lewis base and titanium tetrachloride in any order. This catalyst is then used together with an aluminum alkyl and further Lewis bases for the polymerization of olefins.

The catalysts described in EP-A-032307 are prepared by addition of an aluminum alkyl and a magnesium alkyl to an inorganic support and subsequent addition of a titanium compound and a halogenating reagent or alcohol.

EP-A-594915 discloses a process for preparing Ziegler catalysts, in which a support material containing OH groups is reacted with a dialkylmagnesium or trialkylaluminum compound, the resulting intermediate is brought into contact with a monochloroorganic compound, a tetravalent titanium compound is subsequently added and the intermediate formed is reacted with an alcohol which contains only C, H and O and is not aromatic. As a result of the addition of the alcohol, a narrower molar mass distribution of the polyethylene prepared therewith is achieved.

EP-A-595574 describes a process for preparing Ziegler-Natta catalysts, in which a granular support material is brought into contact with an organosilicon compound, a dialkylmagnesium compound and optionally a trialkylaluminum compound, a monochloroorganic compound and at least one tetravalent titanium compound. The organosilicon compound is used here to reduce the content of OH groups on the granular support. As a result of the addition of the organosilicon compound, a narrower molar mass distribution and a lower molar mass of the polyethylene prepared therewith are achieved.

EP-A-744416 discloses a process for preparing Ziegler-Natta catalysts, in which a granular oxidic material is firstly brought into contact with a dialkylmagnesium compound and a trialkylaluminum compound in any order. This intermediate is reacted with an organic halogenating reagent and then with a tetravalent titanium compound. If desired, a further organosilicon compound can be used to reduce the content of OH groups on the granular support, and is therefore added to the support material at the beginning of the preparation process.

It is an object of the present invention to develop a Ziegler catalyst which displays a high productivity and at the same time gives polymers having a high bulk density. Furthermore, the copolymers formed should have a low content of extractable material, especially in the relatively low density range. Copolymers prepared by means of a Ziegler catalyst usually have quite high proportions of extractable, i.e. low molecular weight, material, especially at densities in the range from 0.91 to 0.93 g/cm³.

We have found that this object is achieved by a process for preparing catalyst systems of the Ziegler-Natta type, which comprises the following steps:

A) bringing an inorganic metal oxide into contact with an organometallic compound of group 3 of the Periodic Table, B) bringing the intermediate obtained from step A) or the inorganic metal oxide into contact with a magnesium compound $MgR^1{}_nX^1{}_{2-n}$,
where $X^1$ are each, independently of one another, fluorine, chlorine, bromine, iodine, hydrogen, $NR^X{}_2$, $OR^X$, $SR^X$, $SO_3R^X$ or $OC(O)R^X$, and $R^1$ and $R^X$ are each, independently of one another, a linear, branched or cyclic $C_1$–$C_{20}$-alkyl, a $C_2$–$C_{10}$-alkenyl, an alkylaryl having 1–10 carbon atoms in the alkyl part and 6–20 carbon atoms in the aryl part or a $C_6$–$C_{18}$-aryl and n is 1 or 2, and subsequently C) bringing the intermediate obtained from step B) into contact with a halogenating reagent, D) bringing the intermediate obtained from step C) into contact with an alcohol of the formula $R^2$—OH,
where $R^2$ is a linear, branched or cyclic $C_1$–$C_{20}$-alkyl, a $C_2$–$C_{10}$-alkenyl, an alkylaryl having 1–10 carbon atoms in the alkyl part and 6–20 carbon atoms in the aryl part or a $C_6$–$C_{18}$-aryl, E) bringing the intermediate obtained from step D) into contact with a tetravalent titanium compound and F) optionally, bringing the intermediate obtained from step E) into contact with a donor compound.

The invention further provides catalyst systems of the Ziegler-Natta type which can be prepared by the process of the present invention, prepolymerized catalyst systems and a process for the polymerization or copolymerization of olefins at from 20 to 150° C. and pressures of from 1 to 100 bar, wherein the polymerization or copolymerization is carried out in the presence of at least one catalyst system according to the present invention and optionally an aluminum compound as cocatalyst.

Inorganic metal oxides used are, for example, silica gel, aluminum oxide, hydrotalcite, mesoporous materials and aluminosilicate, in particular silica gel.

The inorganic metal oxide can have been partially or fully modified prior to the reaction in step A). The support material can, for example, be treated at from 100 to 1000° C. under oxidizing or nonoxidizing conditions, in the presence or absence of fluorinating agents such as ammonium hexafluorosilicate. This makes it possible to vary, inter alia, the water content and/or OH group content. The support material is preferably dried under reduced pressure for from 1 to 10 hours at from 100 to 800° C., preferably from 150 to 650° C., before being used in the process of the present invention.

In general, the inorganic metal oxide has a mean particle diameter of from 5 to 200 µm, preferably from 10 to 100 µm and particularly preferably from 20 to 70 µm a mean average pore volume of from 0.1 to 10 ml/g, in particular from 0.8 to 4.0 ml/g and particularly preferably from 0.8 to 2.5 ml/g, and a specific surface area of from 10 to 1000 m²/g, in particular from 50 to 900 m²/g, especially from 100 to 600 m²/g. The inorganic metal oxide can be spherical or granular, preferably spherical.

The specific surface area and the mean pore volume are determined by nitrogen adsorption in accordance with the BET method as described, for example, in S. Brunauer, P.

Emmett and E. Teller in Journal of the American Chemical Society, 60, (1939), pages 209–319.

In another preferred embodiment, the inorganic metal oxide is used as spray-dried silica gel. In general, the primary particles of the spray-dried silica gel have a mean particle diameter of from 1 to 10 μm, in particular from 1 to 5 μm. The primary particles are porous, granular silica gel particles which are obtained by milling of an $SiO_2$ hydrogel, if appropriate combined with sieving. The spray-dried silica gel can then be produced by spray drying the primary particles slurried with water or an aliphatic alcohol. However, such a silica gel is also commercially available. The spray-dried silica gel which can be obtained in this way also has voids or channels which have a mean diameter of from 1 to 10 μm, in particular from 1 to 5 μm, and whose macroscopic proportion by volume in the total particle is in the range from 5 to 20%, in particular in the range from 5 to 15%. These voids and channels usually have a positive effect on the diffusion-controlled supply of monomers and cocatalysts and thus also on the polymerization kinetics.

The inorganic metal oxide is firstly reacted in step A) with an organometallic compound $MR_mX_{3-m}$, where X are each, independently of one another, fluorine, chlorine, bromine, iodine, hydrogen, $NR^X_2$, $OR^X$, $SR^X$, $SO_3R^X$ or $OC(O)R^X$, and R and $R^X$ are each, independently of one another, a linear, branched or cyclic $C_1$–$C_{20}$-alkyl, a $C_2$–$C_{10}$-alkenyl, an alkylaryl having 1–10 carbon atoms in the alkyl part and 6–20 carbon atoms in the aryl part or a $C_6$–$C_{18}$-aryl, M is a metal of group 3 of the Periodic Table, preferably B, Al or Ga and particularly preferably Al, and m is 1, 2 or 3.

R are, independently of one another, a linear, branched or cyclic $C_1$–$C_{20}$-alkyl, e.g. methyl, ethyl, n-propyl, isopropyl, n-butyl, sec-butyl, isobutyl, tert-butyl, n-pentyl, sec-pentyl, isopentyl, n-hexyl, n-heptyl, n-octyl, n-nonyl, n-decyl or n-dodecyl, cyclopropyl, cyclobutyl, cyclopentyl, cyclohexyl, cycloheptyl, cyclooctyl, cyclononyl or cyclododecyl, a $C_2$–$C_{10}$-alkenyl which may be linear, cyclic or branched and have an internal or terminal double bond, e.g. vinyl, 1-allyl, 2-allyl, 3-allyl, butenyl, pentenyl, hexenyl, cyclopentenyl, cyclohexenyl, cyclooctenyl or cyclooctadienyl, an alkylaryl having 1–10 carbon atoms in the alkyl part and 6–20 carbon atoms in the aryl part, e.g. benzyl, o-, m-, p-methylbenzyl, 1- or 2-ethylphenyl, or a $C_6$–$C_{18}$-aryl which may be substituted by further alkyl groups, e.g. phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, 2-biphenyl, o-, m-, p-methylphenyl, 2,3-, 2,4-, 2,5- or 2,6-dimethylphenyl, 2,3,4-, 2,3,5-, 2,3,6-, 2,4, 5-, 2,4,6- or 3,4,5-trimethylphenyl, where two R may also be joined to form a 5- or 6-membered ring and the organic radicals R may also be substituted by halogens such as fluorine, chlorine or bromine.

X are each, independently of one another, fluorine, chlorine, bromine, iodine, hydrogen, amide $NR^X_2$, alkoxide $OR^X$, thiolate $SR^X$, sulfonate $SO_3R^X$ or carboxylate $OC(O)R^X$, where $R^X$ is as defined for R. $NR^X_2$ can be, for example, dimethylamino, diethylamino or diisopropylamino, $OR^X$ may be methoxy, ethoxy, isopropoxy, butoxy, hexoxy or 2-ethylhexoxy, $SO_3R^X$ may be methylsulfonate, trifluoromethylsulfonate or toluenesulfonate and $OC(O)R^X$ may be formate, acetate or propionate.

The inorganic metal oxide is preferably brought into contact with an organometallic compound of group 3 of the Periodic Table. As organometallic compound of group 3 of the Periodic Table, preference is given to using an aluminum compound $AlR_mX_{3-m}$, where the variables are as defined above. Suitable compounds are, for example, trialkylaluminum compounds such as trimethylaluminum, triethylaluminum, triisobutylaluminum or tributylaluminum, dialkylaluminum halides such as dimethylaluminum chloride, diethylaluminum chloride or dimethylaluminum fluoride, alkylaluminum dihalides such as methylaluminum dichloride or ethylaluminum dichloride, or mixtures such as methylaluminum sesquichloride. The hydrolysis products of aluminum alkyls with alcohols can also be used. Preferred aluminum compounds are those in which X is chlorine. Among these aluminum compounds, particular preference is given to those in which m is 2. Preference is given to using dialkylaluminum halides $AlR_2X$ in which X is halogen, in particular chlorine, and R is, in particular, a linear, branched or cyclic $C_1$–$C_{20}$-alkyl. Very particular preference is given to using dimethylaluminum chloride or diethylaluminum chloride.

Step A) can be carried out in any aprotic solvent. Particular preference is given to aliphatic and aromatic hydrocarbons in which the organometallic compound of group 3 of the Periodic Table is soluble, e.g. pentane, hexane, heptane, octane, dodecane, a benzene or a $C_7$–$C_{10}$-alkylbenzene such as toluene, xylene or ethylbenzene. A particularly preferred solvent is ethylbenzene.

The inorganic metal oxide is usually slurried in the aliphatic or aromatic hydrocarbon, and the organometallic compound is added thereto. The organometallic compound can be added as a pure substance or else as a solution in an aliphatic or aromatic hydrocarbon, preferably pentane, hexane, heptane or toluene. However, it is also possible, for example, to add the solution of the organometallic compound to the dry inorganic metal oxide. Reaction step A) can be carried out at from 0 to 100° C., preferably from 20 to 50° C.

The organometallic compound is usually used in an amount of from 0.005 to 100 mmol, preferably from 0.05 to 5 mmol and particularly preferably from 0.1 to 1 mmol, per g of inorganic metal oxide. It is also possible to add only part of the organometallic compound, e.g. from 0.005 to 0.15 mmol, in step A) and to add further organometallic compound up to the total amount of up to 100 mmol, preferably up to 5 mmol and particularly preferably up to 1 mmol, during one or more of the further steps. Preference is given to using the total amount of the organometallic compound in step A).

In step B), the intermediate obtained from step A) is reacted, usually without work-up or isolation, with the magnesium compound $MgR^1_nX^1_{2-n}$, where, $X^1$ are each, independently of one another, fluorine, chlorine, bromine, iodine, hydrogen, $NR^X_2$, $OR^X$, $SR^X$, $SO_3R^X$ or $OC(O)R^X$, and $R^1$ and $R^X$ are each, independently of one another, a linear, branched or cyclic $C_1$–$C_{20}$-alkyl, a $C_2$–$C_{10}$-alkenyl, an alkylaryl having 1–10 carbon atoms in the alkyl part and 6–20 carbon atoms in the aryl part or a $C_6$–$C_{18}$-aryl and n is 1 or 2.

$X^1$ has the same meanings as defined above for X. $X^1$ is preferably chlorine, bromine, methoxy, ethoxy, iso-propoxy, butoxy or acetate.

$R^1$ and $R^X$ have the same meanings as given above for R. In particular, $R^1$ are each, independently of one another, methyl, ethyl, n-propyl, isopropyl, n-butyl, sec-butyl, isobutyl, tert-butyl, n-pentyl, sec-pentyl, isopentyl, n-hexyl, n-heptyl, n-octyl, benzyl, o-, m-, p-methylbenzyl, 1- or 2-ethylphenyl, phenyl or 1-naphthyl.

Suitable magnesium compounds are, in particular, magnesium halides, magnesium alkyls and magnesium aryls, and also magnesium alkoxide and magnesium aryl-oxide compounds, preferably magnesium dichloride, magnesium dibromide and di ($C_1$–$C_{10}$-alkyl)magnesium compounds.

In a particularly preferred embodiment, magnesium compounds $MgR^1_2$ such as dimethylmagnesium, diethylmagnesium, dibutylmagnesium, dibenzylmagnesium, (butyl)(ethyl)magnesium or (butyl)(octyl)magnesium are used. These have a good solubility in nonpolar solvents. Preference is given to (n-butyl) (ethyl)magnesium and (butyl)(octyl)magnesium. In mixed compounds such as (butyl)(octyl)magnesium, the radicals $R^1$ can be present in various ratios, e.g. preference is given to using $(butyl)_{1.5}(octyl)_{0.5}$magnesium.

Solvents suitable for step B) are the same ones as for step A). Particularly useful solvents are aliphatic and aromatic hydrocarbons in which the magnesium compound is soluble, e.g. pentane, hexane, heptane, octane, isooctane, nonane, dodecane, cyclohexane, benzene or a $C_7$–$C_{10}$-alkylbenzene such as toluene, xylene or ethyl-benzene. A particularly preferred solvent is heptane.

The intermediate obtained from step A) is usually slurried in the aliphatic and/or aromatic hydrocarbon, and the magnesium compound is added thereto. The magnesium compound can be added as pure substance or else, preferably, as a solution in an aliphatic or aromatic hydrocarbon, e.g. pentane, hexane, heptane or toluene. However, it is also possible, for example, to add the solution of the magnesium compound to the intermediate obtained from step A). The reaction is usually carried out at from 0 to 150° C., preferably from 30 to 120° C. and particularly preferably from 40 to 100° C.

The magnesium compound is usually used in an amount of from 0.05 to 10 mmol, preferably from 0.5 to 5 mmol and particularly preferably from 0.7 to 4 mmol, per g of inorganic metal oxide.

The intermediate obtained from reaction step B) is, preferably without intermediate isolation, reacted in step C) with a halogenating reagent. As halogenating reagents, it is possible to use compounds which can halogenate the magnesium compound employed, e.g. hydrogen halides such as HF, HCl, HBr and HI, silicon halides such as tetrachlorosilane, trichloromethylsilane, dichlorodimethylsilane or trimethylchlorosilane, carboxylic halides such as acetyl chloride, formyl chloride or propionyl chloride, boron halides, phosphorus pentachloride, thionyl chloride, sulfuryl chloride, phosgene, nitrosyl chloride, mineral acid halides, chlorine, bromine, chlorinated polysiloxanes, alkylaluminum chlorides, aluminum trichloride, ammonium hexafluorosilicate and alkyl-halogen compounds of the formula $R^Y_s$—C—$Y_{4-s}$, where $R^Y$ is hydrogen or a linear, branched or cyclic $C_1$–$C_{20}$-alkyl such as methyl, ethyl, n-propyl, isopropyl, n-butyl, sec-butyl, isobutyl, tert-butyl, n-pentyl, sec-pentyl, isopentyl, n-hexyl, n-heptyl, n-octyl, n-nonyl, n-decyl or n-dodecyl, cyclopropyl, cyclobutyl, cyclopentyl, cyclohexyl, cycloheptyl, cyclooctyl, cyclononyl or cyclododecyl, with the radicals $R^Y$ also being able to be substituted by chlorine or bromine, Y is chlorine or bromine and s is 0, 1, 2 or 3. Halogenating reagents such as titanium tetrahalides, for example titanium tetrachloride, are not very suitable. Preference is given to using a chlorinating reagent. Preferred halogenating reagents are alkyl-halogen compounds of the formula $R^Y_s$—C—$Y_{4-s}$ such as methyl chloride, ethyl chloride, n-propyl chloride, n-butyl chloride, tert-butyl chloride, dichloromethane, chloroform or carbon tetrachloride. Very particular preference is given to alkyl halide compounds of the formula $R^Y$—C—$Cl_3$ in which $R^Y$ is preferably hydrogen, methyl, ethyl, n-propyl, isopropyl, n-butyl, sec-butyl, isobutyl, tert-butyl, n-pentyl, sec-pentyl, isopentyl or n-hexyl. These give catalysts having particularly high productivities. Very particular preference is given to chloroform.

Suitable solvents for step C) are in principle the same ones as for step A). The reaction is usually carried out at from 0 to 200° C., preferably from 20 to 150° C.

In general, the molar ratio of halogenating reagent used to magnesium compound used is in the range from 4:1 to 0.05:1, preferably from 3:1 to 0.5:1 and particularly preferably from 2:1 to 1:1. The magnesium compound can be partially or fully halogenated in this way. The magnesium compound is preferably fully halogenated.

The amount of precipitated magnesium halide is generally from 1 to 200% by weight of the inorganic metal oxide, preferably from 2 to 100% by weight of the inorganic metal oxide and particularly preferably from 5 to 20% by weight of the inorganic metal oxide. The magnesium halide is generally distributed uniformly over the inorganic metal oxide. A preferred magnesium halide is magnesium chloride.

The intermediate obtained from step C) is usually reacted without intermediate isolation with one or more alcohols, preferably one alcohol, of the formula $R^2$—OH, where $R^2$ is a linear, branched or cyclic $C_1$–$C_{20}$-alkyl, a $C_2$–$C_{10}$-alkenyl, an alkylaryl having 1–10 carbon atoms in the alkyl part and 6–20 carbon atoms in the aryl part or a $C_6$–$C_{18}$-aryl. $R^2$ has the same meanings as those described above for R. Examples of suitable alcohols are methanol, ethanol, 1-propanol, 2-propanol, 1-butanol, 2-butanol, 1-pentanol, 2-pentanol, 1-hexanol, 2-ethylhexanol, 2,2-dimethylethanol or 2,2-dimethylpropanol, in particular ethanol, 1-propanol, 1-butanol, 1-pentanol, 1-hexanol or 2-ethylhexanol.

Suitable solvents for step D) are the same ones as for step A). The reaction is usually carried out at from 0 to 150° C., preferably from 20 to 100° C. and particularly preferably from 60 to 100° C.

The molar ratio of alcohol used to magnesium compound used is usually in a range from 0.01:1 to 20:1, preferably from 0.05:1 to 10:1 and particularly preferably from 0.1:1 to 1:1.

The inorganic metal oxide with the magnesium compound precipitated thereon which can be obtained in this way can then be used directly for step E). However, it is preferably isolated. This can be achieved, for example, by distilling off the solvent or preferably by filtration and washing with an aliphatic hydrocarbon such as pentane, hexane or heptane. This can be followed by a drying step in which all or some of the residual solvent is removed.

The intermediate obtained from step D) is brought into contact with a tetravalent titanium compound in step E).

Tetravalent titanium compounds used are generally compounds of tetravalent titanium of the formula $(R^3O)_tX^2_{4-t}Ti$, where the radical $R^3$ has the same meanings as defined above for R and $X^2$ has the meanings as defined above for X and t is from 0 to 4. Examples of suitable compounds are tetraalkoxytitaniums (t=4) such as tetramethoxytitanium, tetraethoxytitanium, tetrapropoxytitanium, tetraisopropoxytitanium, tetrabutoxytitanium or titanium(IV) 2-ethylhexoxide, trialkoxytitanium halides (t=3 and $X^2$=halide) such as titanium chloride triisopropoxide and titanium tetrahalides (t=0, $X^2$=halogen). Preference is given to titanium compounds in which $X^2$ is chlorine or bromine, particularly preferably chlorine. Very particular preference is given to using titanium tetrachloride.

The intermediate obtained from step D) is usually slurried in a suspension medium, and the titanium compound is added thereto. However, it is also possible, for example, to dissolve the titanium compound in the suspension medium and subsequently to add the solution to the intermediate obtained from step D). The titanium compound is preferably soluble in the suspension medium. Suitable suspension media are, in particular, aliphatic and aromatic hydrocarbons such as pentane, hexane, heptane, octane, dodecane, benzene or $C_7$–$C_{10}$-alkylbenzenes such as toluene, xylene or ethylbenzene. A particularly preferred solvent is ethylbenzene. Reaction step E) is usually carried out at from 20 to 150° C., preferably from 40 to 100° C.

The molar ratio of titanium compound used to magnesium compound used is generally in the range from 20:1 to 0.05:1, preferably from 10:1 to 0.5:1 and particularly preferably from 2:1 to 1:1. In addition, the amount of titanium compound used is usually chosen so that it is in a range from 0.1 to 20 mmol, preferably from 0.5 to 15 mmol and particularly preferably from 1 to 10 mmol, per g of inorganic metal oxide.

The intermediate obtained from step E) can optionally be brought into contact with a donor compound, for example a monofunctional or polyfunctional carboxylic acid, carboxylic anhydride or carboxylic ester, or else a ketone, ether, alcohol, lactone or organophosphorus or organosilicon compound. Preference is given to using a donor compound which contains at least one nitrogen atom, preferably one nitrogen atom, for example a monofunctional or polyfunctional carboxamide, amino acid, urea, imine or amine. Preference is given to using a nitrogen-containing compound or a mixture of a plurality of nitrogen-containing compounds. Preference is given to amines of the formula $NR^4_2R^5$, where $R^4$ and $R^5$ are each, independently of one another, linear, branched or cyclic $C_1$–$C_{20}$-alkyl such as methyl, ethyl, n-propyl, isopropyl, n-butyl, sec-butyl, isobutyl, tert-butyl, n-pentyl, sec-pentyl, isopentyl, n-hexyl, n-heptyl, n-octyl, n-nonyl, n-decyl or n-dodecyl, cyclopropyl, cyclobutyl, cyclopentyl, cyclohexyl, cycloheptyl, cyclooctyl, cyclononyl or cyclododecyl, $C_2$–$C_{20}$-alkenyl which may be linear, cyclic or branched and may have an internal or terminal double bond, e.g. vinyl, 1-allyl, 2-allyl, 3-allyl, butenyl, pentenyl, hexenyl, cyclopentenyl, cyclohexenyl, cyclooctenyl or cyclooctadienyl, $C_6$–$C_{20}$-aryl which may be substituted by further alkyl groups, e.g. phenyl, naphthyl, biphenyl, anthranyl, o-, m-, p-methylphenyl, 2,3-, 2,4-, 2,5- or 2,6-dimethylphenyl, 2,3,4-, 2,3,5-, 2,3,6-, 2,4,5-, 2,4,6- or 3,4,5-trimethylphenyl, or aralkyl which may be substituted by further alkyl groups, e.g. benzyl, o-, m-, p-methylbenzyl, 1- or 2-ethylphenyl, where $R^4$ and $R^5$ may also be joined to form a 5- or 6-membered ring and the organic radicals $R^4$ and $R^5$ may also be substituted by halogens such as fluorine, chlorine or bromine, or are. $SiR^6_3$. In addition, $R^4$ may also be hydrogen. Preference is given to amines in which one $R^4$ is hydrogen. Possible radicals $R^6$ in organosilicon radicals $SiR^6_3$ are the same radicals as have been described above for $R^5$, with two $R^6$ also being able to be joined to form a 5- or 6-membered ring. Examples of suitable organosilicon radicals are trimethylsilyl, triethylsilyl, butyldimethylsilyl, tributylsilyl, triallylsilyl, triphenylsilyl or dimethylphenylsilyl. In a particularly preferred embodiment, use is made of amines of the formula $HN(SiR^6_3)_2$, in particular those in which $R^6$ is a linear, branched or cyclic $C_1$–$C_{20}$-alkyl such as methyl, ethyl, n-propyl, isopropyl, n-butyl, sec-butyl, isobutyl, tert-butyl, n-pentyl, sec-pentyl, isopentyl, n-hexyl, n-heptyl, n-octyl, n-nonyl, n-decyl or n-dodecyl, cyclopropyl, cyclobutyl, cyclopentyl, cyclohexyl, cycloheptyl, cyclooctyl, cyclononyl or cyclododecyl. Very particular preference is given to hexamethyldisilazane.

The intermediate obtained from step E) is usually slurried with a suspension medium, and the donor compound is added thereto. However, it is also possible, for example, to dissolve the donor compound in the suspension medium and subsequently to add the solution to the intermediate obtained from step E). The donor compound is preferably soluble in the suspension medium. Suitable suspension media are, in particular, aliphatic and aromatic hydrocarbons such as pentane, hexane, heptane, octane, dodecane, benzene or $C_7$–$C_{10}$-alkylbenzenes such as toluene, xylene or ethylbenzene.

Step F) is usually carried out at from 0 to 150° C., preferably from 0 to 100° C. and particularly preferably from 20 to 70° C.

The molar ratio of titanium compound used to donor compound used is generally in the range from 1:100 to 1:0.05, preferably from 1:10 to 1:0.1 and particularly preferably from 1:1 to 1:0.4.

The catalyst system obtained in this way can subsequently be washed one or more times with an aliphatic or aromatic hydrocarbon such as pentane, hexane, heptane, octane, nonane, decane, dodecane, cyclohexane, benzene or a $C_7$–$C_{10}$-alkylbenzene such as toluene, xylene or ethylbenzene. Preference is given to using aliphatic hydrocarbons, in particular pentane, n-hexane or isohexane, n-heptane or isoheptane. This is usually carried out at from 0 to 200° C., preferably from 0 to 150° C. and particularly preferably from 20 to 100° C., for from 1 minute to 20 hours, preferably for from 10 minutes to 10 hours and particularly preferably for from 30 minutes to 5 hours. The catalyst is stirred in the solvent and then filtered off. This step can also be repeated once or twice. Instead of a plurality of successive washing steps, the catalyst can also be washed by means of an extraction, e.g. in a Soxhlett apparatus, by means of which continuous washing is achieved.

Step F) or the washing step is preferably followed by a drying step in which all or some of the residual solvent is removed. The novel catalyst system obtained in this way can be completely dry or have a certain residual moisture content. However, the content of volatile constituents should be not more than 20% by weight, in particular not more than 10% by weight, based on the catalyst system.

The novel catalyst system obtainable in this way preferably has a titanium content of from 0.1 to 30% by weight, preferably from 0.5 to 10% by weight and particularly preferably from 0.7 to 3% by weight, and a magnesium content of from 0.1 to 30% by weight, preferably from 0.5 to 20% by weight and particularly preferably from 1 to 10% by weight. The aluminum content is preferably in the range from 0.01 to 20% by weight, preferably from 0.1 to 10% by weight and particularly preferably from 0.2 to 5% by weight.

It is also possible for the catalyst system firstly to be prepolymerized with α-olefins, preferably linear $C_2$–$C_{10}$-1-alkenes and in particular with ethylene or propylene, and the resulting prepolymerized catalyst solid then to be used in the actual polymerization. The mass ratio of catalyst solid used in the prepolymerization to polymerized-on monomer is usually in the range from 1:0.1 to 1:200.

Furthermore, a small amount of an olefin, preferably an α-olefin, for example vinylcyclohexane, styrene or phenyldimethylvinylsilane, as modifying component, an antistatic or a suitable inert compound such as a wax or oil can be added as additive during or after the preparation of the supported catalyst system. The molar ratio of additives to transition metal compound B) is usually in the range from 1:1000 to 1000:1, preferably from 1:5 to 20:1.

The process for the polymerization or copolymerization of olefins in the presence of at least one catalyst system according to the present invention and, if desired, an aluminum compound as cocatalyst is carried out at from 20 to 150° C. and pressures of from 1 to 100 bar.

The process of the present invention for the polymerization of olefins can be combined with all industrially known polymerization processes at temperatures in the range from 20 to 150° C. and under pressures of from 5 to 100 bar. The advantageous pressure and temperature ranges for carrying out the process therefore depend greatly on the polymerization method. Thus, the catalyst systems which can be used according to the present invention can be employed in all known polymerization processes in bulk, in suspension, in the gas phase or in a supercritical medium in the customary reactors used for the polymerization of olefins, i.e., for example, in suspension polymerization processes, in solution polymerization processes, in stirred gas-phase processes or in gas-phase fluidized-bed processes. The process can be carried out batchwise or preferably continuously in one or more stages.

Among the polymerization processes mentioned, preference is given to gas-phase polymerization, in particular in gas-phase fluidized-bed reactors, solution polymerization and suspension polymerization, in particular in loop reactors and stirred tank reactors. Suitable gas-phase fluidized-bed processes are described in detail in, for example, EP-A-0 004 645, EP-A-0 089 691, EP-A-0 120 503 or EP-A-0 241 947. The gas-phase polymerization can also be carried out in the condensed or supercondensed mode in which part of the circulating gas is cooled to below the dew point and recirculated to the reactor as a two-phase mixture.

The various, or else identical, polymerization processes can also, if desired, be connected in series to form a polymerization cascade. The molar mass of the polyalk-1-enes formed can be controlled and adjusted over a wide range by addition of regulators customary in polymerization technology, for example hydrogen. Furthermore, further customary additives such as antistatics can also be used in the polymerizations. In addition, the product output can be varied via the amount of Ziegler catalyst metered in. The (co)polymers discharged from the reactor can then be conveyed to a deodorization or deactivation vessel where they can be subjected to a customary and known treatment with nitrogen and/or steam.

Low-pressure polymerization processes are generally carried out at a temperature which is at least a few degrees below the softening temperature of the polymer. In particular, these polymerization processes are carried out at from 50 to 150° C., preferably from 70 to 120° C. In suspension polymerization processes, the polymerization is usually carried out in a suspension medium, preferably in an inert hydrocarbon such as isobutane, or else in the monomers themselves. The polymerization temperatures are generally in the range from 20 to 150° C., while the pressure is generally in the range from 1 to 100 bar. The solids content of the suspension is generally in the range from 10 to 80%.

Various olefinically unsaturated compounds can be polymerized by the process of the present invention. For the purposes of the present invention, the term polymerization encompasses copolymerization. Possible olefins are ethylene and linear or branched α-olefins having from 3 to 12 carbon atoms, e.g. propene, 1-butene, 1-pentene, 1-hexene, 1-heptene, 1-octene, 1-nonene, 1-decene, 1-dodecene or 4-methyl-1-pentene, and also nonconjugated and conjugated dienes such as butadiene, 1,5-hexadiene or 1,6-heptadiene, cyclic olefins such as cyclohexene, cyclopentene or norbornene and polar monomers such as acrylic esters, acrylamides, acrolein, acrylonitrile, ester or amide derivatives of methacrylic acid, vinyl ethers, allyl ethers and vinyl acetate. It is also possible to polymerize mixtures of various α-olefins. Vinylaromatic compounds such as styrene can also be polymerized by the process of the present invention. Preference is given to polymerizing at least one α-olefin selected from the group consisting of ethene, propene, 1-butene, 1-pentene, 1-hexene, 1-heptene, 1-octene and 1-decene, in particular ethene.

It is also possible to copolymerize mixtures of three or more olefins. In a preferred embodiment of the process of the present invention, ethylene is homopolymerized or ethylene is copolymerized with $C_3$–$C_8$-α-monoolefins, in particular ethylene with $C_3$–$C_8$-α-olefins. In a further preferred embodiment of the process of the present invention, ethylene is copolymerized with an α-olefin selected from the group consisting of propene, 1-butene, 1-pentene, 1-hexene, 1-heptene and 1-octene.

Some of the catalyst systems according to the present invention have little if any polymerization activity on their own and are then brought into contact with an aluminum compound. as cocatalyst in order to display good polymerization activity. Aluminum compounds suitable as cocatalyst are, in particular, compounds of the formula $AlR^7_m X^3_{3-m}$, where $R^7$ has the same meanings as defined above for R and $X^3$ has the same meanings as defined above for X and m is 1, 2 or 3. Apart from trialkylaluminum, suitable cocatalysts also include compounds of this type in which one or two alkyl groups are replaced by an alkoxy group, in particular $C_1$–$C_{10}$-dialkylaluminum alkoxides such as diethylaluminum ethoxide, or by one or two halogen atoms, for example by chlorine or bromine, in particular dimethylaluminum chloride, methylaluminum dichloride, methylaluminum sesquichloride or diethylaluminum chloride. Preference is given to using trialkylaluminum compounds whose alkyl groups each have from 1 to 15 carbon atoms, for example trimethylaluminum, methyldiethylaluminum, triethylaluminum, triisobutylaluminum, tributylaluminum, trihexylaluminum or trioctylaluminum. It is also possible to use cocatalysts of the aluminoxane type, in particular methylaluminoxane MAO. Aluminoxanes are prepared, for example, by controlled addition of water to alkylaluminum compounds, in particular trimethylaluminum.

Aluminoxane preparations suitable as cocatalyst are commercially available.

The amount of aluminum compounds to be used depends on their effectiveness as cocatalyst. Since many of the cocatalysts can at the same time be used for removing catalyst poisons (i.e. they act as scavengers), the amount used depends on the impurities in the other starting materials. However, a person skilled in the art can determine the optimum amount by means of simple tests. The cocatalyst is preferably used in such an amount that the atomic ratio of aluminum from the aluminum compound used as cocatalyst to titanium from the catalyst system of the present invention is from 10:1 to 800:1, in particular from 20:1 to 200:1.

The various aluminum compounds can be used as cocatalyst in any order, either individually or as a mixture of two or more components. Thus, these aluminum compounds acting as cocatalysts can be allowed to act in succession or together on the catalyst systems of the present invention. The catalyst system of the present invention can be brought into contact with the cocatalyst(s) either before or after being brought into contact with the olefins to be polymerized. Preactivation using one or more cocatalysts before mixing with the olefin and further addition of the same or other cocatalysts after bringing the preactivated mixture into contact with the olefin is also possible. Preactivation is usually carried out at from 0 to 150° C., in particular from 20 to 80° C., and pressures of from 1 to 100 bar, in particular from 1 to 40 bar.

To obtain a broad product spectrum, the catalyst systems of the present invention can also be used in combination with at least one catalyst customary for the polymerization of olefins. Possible catalysts for this purpose are, in particular, Phillips catalysts based on chromium oxides, metallocenes (e.g. EP-A-129368), constrained geometry complexes (cf., for example, EP-A-0416815 or EP-A-0420436), nickel- and palladium-bisimine systems (for the preparation of these, see WO-A-98/03559), iron- and cobalt-pyridine-bisimine compounds (for the preparation of these, see WO-A-98/27124) or chromium amides (cf., for example 95JP-170947). Further suitable catalysts include metallocenes having at least one ligand formed from a cyclopentadienyl or heterocyclopentadienyl with a fused-on heterocycle, where the heterocycles are preferably aromatic and preferably contain nitrogen and/or sulfur. Such compounds are described, for example, in WO 98/22486. Further suitable catalysts include substituted monocyclopentadienyl, monoindenyl, monofluorenyl or heterocyclopentadienyl complexes of chromium in which at least one of the substituents on the cyclopentadienyl ring bears a donor function. Furthermore, a further cocatalyst can additionally be added to the catalysts to make the catalysts active in olefin polymerization. These are preferably cation-forming compounds. Suitable cation-forming compounds are, for example, compounds such as an aluminoxane, a strong uncharged Lewis acid, in particular tris(pentafluorophenyl)borane, an ionic compound having a Lewis-acid cation or an ionic compound containing a Brönsted acid as cation, in particular N,N-dimethylanilinium tetrakis(pentafluorophenyl)borates and in particular N,N-dimethylcyclohexylammonium tetrakis(pentafluorophenyl)borate or N,N-dimethylbenzylammonium tetrakis(pentafluorophenyl)borate. Thus, for example, bimodal products can be produced or comonomers can be generated in situ by means of such combinations with further catalysts. In such a case, the catalyst system of the present invention is preferably used in the presence of at least one catalyst customary for the polymerization of olefins and, if desired, one or more cocatalysts. The catalysts customary for the polymerization of olefins can have been applied to the same inorganic metal oxide or can be immobilized on another support material and be used simultaneously or in any order with the catalyst system of the present invention.

The process of the present invention makes it possible to prepare olefin polymers having molar masses in the range from about 10 000 to 5 000 000, preferably from 20 000 to 1 000 000, with polymers having molar masses (weight average) of from 20 000 to 400 000 being particularly preferred.

The catalyst systems of the present invention are particularly suitable for preparing ethylene homopolymers and ethylene copolymers with α-olefins. Thus, homopolymers of ethylene or copolymers of ethylene with $C_3$–$C_{12}$-α-olefins having a comonomer content of up to 10% by weight of the copolymer can be prepared. Preferred copolymers contain from 0.3 to 1.5 mol % of hexene, particularly preferably from 0.5 to 1 mol % of hexene, based on the polymer.

The bulk densities of the ethylene homopolymers and ethylene copolymers with α-olefins which are obtainable in this way are in the range from 240 to 590 g/l, preferably from 245 to 550 g/l.

In particular, a copolymer of ethylene with $C_4$–$C_8$-α-olefin, in particular an ethylene-hexene copolymer, having a density of 0.915–0.92 g/cm$^3$, a bulk density of from 300 to 500 g/l, a polydispersity $M_w/M_n$ of from 4 to 8, preferably from 4.5 to 6, and a proportion of material extractable by means of cold heptane of from 0.01 to 3% by weight, preferably from 0.05 to 2% by weight, based on the ethylene copolymer, can be obtained using the catalyst system of the present invention.

The polymer of the present invention can also form blends with other olefin polymers, in particular ethylene homopolymers and copolymers. These blends can be prepared either by means of the above-described simultaneous polymerization using a plurality of catalysts, or simply by subsequent blending of the polymers of the present invention with other ethylene homopolymers or copolymers.

The polymers, ethylene copolymers, polymer mixtures and blends can further comprise auxiliaries and/or additives known per se, e.g. processing stabilizers, stabilizers against the action of light and heat, customary additives such as lubricants, antioxidants, antiblocking agents and antistatics, and also, if desired, colorants. A person skilled in the art will be familiar with the type and amount of these additives.

The polymers of the present invention can also be modified subsequently by grafting, crosslinking, hydrogenation, functionalization or other modification reactions with which a person skilled in the art will be familiar.

Owing to their good mechanical properties, the olefin polymers and copolymers prepared using the catalyst systems of the present invention, in particular the ethylene homopolymers and copolymers, are especially suitable for producing films, fibers and moldings.

The catalyst system of the present invention is very useful for preparing homopolymers and copolymers of ethylene. It gives high productivities, even at high polymerization temperatures. The polymers prepared therewith have high bulk densities and low contents of material extractable by means of cold heptane.

EXAMPLES AND COMPARATIVE EXPERIMENTS

The parameters reported in the tables were determined by the following measurement methods:

Density: in accordance with ISO 1183

MFI: melt flow index (190° C./2.16) in accordance with ISO 1133

Eta value: by means of an automatic Ubbelohde visco-meter (Lauda PVS 1) using decalin as solvent at 130° C. (ISO 1628 at 130° C., 0.001 g/ml of decalin)

The bulk density (BD) [g/l] was determined in accordance with DIN 53468.

The determination of the molar mass distributions and the means $M_n$, $M_w$ and $M_w/M_n$ derived therefrom was carried out by means of high-temperature gel permeation chromatography (GPC) using a method based on DIN 55672 under the following conditions: solvent: 1,2,4-trichlorobenzene, flow: 1 ml/min, temperature: 140° C., calibration using PE standards.

The cold heptane extract was determined by stirring 10 g of the polymer powder in 50 ml of heptane at 23° C. for 2 hours. The polymer was filtered off from the extract obtained in this way and washed with 100 ml of heptane. The combined heptane phases were freed of solvent and dried to constant weight. The residue is weighed and is the cold heptane extract.

The particle sizes were determined by a method based on ISOWD 13320 particle size analysis using a Malvern Mastersizer 2000 (small volume MS1) under an inert gas atmosphere.

Determination of the magnesium and aluminum contents: The magnesium and aluminum contents were determined on the samples digested in a mixture of concentrated nitric acid, phosphoric acid and sulfuric acid by means of an inductively coupled plasma atomic emission (ICP-AES) spectrometer from Spectro, Kleve, Germany, using the spectral lines at 277.982 nm for magnesium and at 309.271 nm for aluminum. The titanium content was determined on the samples digested in a mixture of 25% strength sulfuric acid and 30% strength hydrogen peroxide using the spectral line at 470 nm.

Example 1

In a first step, 29.4 g of finely divided spray-dried silica gel ES 70X from Crossfield, which had been dried at 600° C., were suspended in ethylbenzene and admixed while stirring with 2 ml of diethylaluminum chloride (2 M in heptane). 41.2 ml of (n-butyl)$_{1.5}$(octyl)$_{0.5}$magnesium (0.875 M in n-heptane) were then added. 5.9 ml of chloroform were added to the solid obtained in this way and a solution of 0.7 ml of ethanol was then slowly added dropwise. 3.9 ml of titanium tetrachloride were added to this mixture, and the resulting solid was filtered off, washed with heptane and dried under reduced pressure. This gave 40 g of the catalyst system having a magnesium content of 2.9% by weight, an aluminum content of 0.06% by weight, a chlorine content of 11.2% by weight and a titanium content of 2.3% by weight, in each case based on the finished catalyst system.

Example 2

In a first step, 29 g of finely divided spray-dried silica gel ES 70X from Crossfield, which had been dried at 600° C., were suspended in ethylbenzene and admixed while stirring with 1.9 ml of diethylaluminum chloride (2 M in heptane). 40.6 ml of (n-butyl)$_{1.5}$(octyl)$_{0.5}$magnesium (0.875 M in n-heptane) were then added. 5.5 ml of chloroform were added to the solid obtained in this way and a solution of 0.7 ml of ethanol was then slowly added dropwise. 3.7 ml of titanium tetrachloride were added to this mixture, the resulting solid was filtered off, resuspended in pentane, and 3.67 ml of hexamethyldisilazane were then added. The pentane was distilled off and the catalyst system obtained in this way was dried under reduced pressure.

Example 3

In a first step, 40.9 g of finely divided spray-dried silica gel ES 70X from Crossfield, which had been dried at 600° C., were suspended in ethylbenzene and admixed while stirring with 2.7 ml of diethylaluminum chloride (2 M in heptane). 57.3 ml of (n-butyl)$_{1.5}$(octyl)$_{0.5}$ magnesium (0.875 M in n-heptane) were then added. 11.45 ml of tert-butyl chloride were added to the solid obtained-in this way and a solution of 1 ml of ethanol was then slowly added dropwise. 5.5 ml of titanium tetrachloride were added to this mixture, the resulting solid was filtered off, resuspended in pentane, and 5.18 ml of hexamethyldisilazane were then added. The pentane was distilled off and the catalyst system obtained in this way was dried under reduced pressure. This gave 70.3 g of the catalyst system according to the present invention.

Example 4 (Comparative Example)

The preparation of the catalyst was carried out using the same components in the same mass and molar ratios as in example 1, but without addition of diethylaluminum chloride (step A).

Example 5 (Comparative Example)

The preparation of the catalyst was carried out using the same components in the same mass and molar ratios as in example 1, but without addition of ethanol (step D).

Example 6 (Comparative Example)

The preparation of the catalyst was carried out using the same components in the same mass and molar ratios as in example 2, but without addition of ethanol (step D).

Example 7 (Comparative Example)

In a first step, 25.7 g of finely divided spray-dried silica gel ES 70X from Crossfield, which had been dried at 600° C., were suspended in ethylbenzene and admixed while stirring with 1.7 ml of diethylaluminum chloride (2 M in heptane). 36 ml of (n-butyl)$_{1.5}$(octyl)$_{0.5}$ magnesium (0.875 M in n-heptane) were then added. 5.51 ml of chloroform were added to the solid obtained in this way and a solution of 0.83 ml of tetrahydrofuran was then slowly added dropwise. 3.4 ml of titanium tetrachloride were added to this mixture, the resulting solid was filtered off, resuspended in pentane, and 3.25 ml of hexamethyldisilazane were then added. The pentane was distilled off and the catalyst system obtained in this way was dried under reduced pressure. This gave 33.9 g of the catalyst system.

Examples 8 to 11

Polymerization

The polymerizations were carried out in a 10 l stirring autoclave. Under nitrogen, 3 g of TEAL (triethylaluminum) together with 3 l of isobutane and 2 l of hexene were introduced into the autoclave at room temperature. The autoclave was then pressurized with 4 bar of $H_2$ and 16 bar of ethylene, the weight of catalyst indicated in table 1 was added and polymerization was carried out at an internal reactor temperature of 70° C. for the time indicated in table 1. The reaction was stopped by venting. Table 1 below reports the productivity of the catalyst systems from examples 1 to 4 both for the examples 8 to 10 according to the present invention and for the comparative example 11.

TABLE 1

| | | Polymerization results | | | |
|---|---|---|---|---|---|
| Ex. | Catalyst from ex. | Weight of catalyst [mg] | Polymerization time [min] | Yield [g of PE] | Productivity [g of PE/ g of cat] |
| 8 | 1 | 38 | 120 | 270 | 7105 |
| 9 | 2 | 99 | 60 | 450 | 4545 |
| 10 | 3 | 132 | 60 | 110 | 833 |
| 11 | 4 (C) | 47 | 120 | 210 | 4468 |

Examples 12 and 13

Polymerization

The polymerizations were carried out under the same conditions as described in examples 8 to 11 using the catalysts from example 3 and comparative example 5. The catalyst from example 3 gave an ethylene copolymer having a bulk density of 416 g/l. The catalyst from comparative example 5 gave an ethylene copolymer having a bulk density of 195 g/l.

Examples 14 to 16

Polymerization 200 mg of triisobutylaluminum were introduced into a 10 l autoclave which had been charged with 150 g of polyethylene and made inert by means of argon. The autoclave was then pressurized with 1 bar of $H_2$ and 10 bar of ethylene, the weight of catalyst indicated in table 2 was added and polymerization was carried out at an internal reactor temperature of 110° C. for one hour. The reaction was stopped by venting.

Table 2 below reports the productivity of the catalyst systems used and the bulk densities of the ethylene polymers obtained both for examples 14 and 15 according to the present invention and for the comparative example 16.

TABLE 2

Polymerization results

| Ex. | Catalyst from ex. | Weight of catalyst [mg] | Bulk density [g/l] | Yield [g of PE] | Productivity [g of PE/ g of cat] |
|---|---|---|---|---|---|
| 14 | 1 | 112 | 249 | 124 | 1107 |
| 15 | 2 | 82 | 358 | 104 | 1268 |
| 16 | 6 (C) | 92 | 324 | 85 | 924 |

Example 17

Polymerization

The polymerization was carried out under the same conditions as described in examples 14 to 16 using the catalyst from comparative example 7.92 mg of catalyst were used in the polymerization and 26 g of polyethylene were obtained after polymerization for one hour at 110° C. The catalyst from comparative example 7 thus displays a productivity of 283 g of polyethylene per g of catalyst.

Examples 18 to 20

The polymerizations were carried out in a gas-phase fluidized-bed reactor having an internal reactor volume of 0.09 m³. The reaction conditions in the reactor are reported in table 3. The polymerization was in each case carried out for one hour at a total pressure of 20 bar with addition of 0.4 g of triethylaluminum per hour.

TABLE 3

Polymerization conditions

| Ex. | Catalyst from ex. | Polymerization temperature [° C.] | Ethylene [% by volume] | $H_2$ [% by volume] | 1-Hexene [% by volume] | Productivity [g of PE/ g of cat] |
|---|---|---|---|---|---|---|
| 18 | 1 | 99 | 28 | 3.0 | 3.2 | 12600 |
| 19 | 2 | 91 | 27 | 3.2 | 4.4 | 5300 |
| 20 | 2 | 98 | 33 | 4.3 | 4.3 | 6700 |

TABLE 4

Polymer properties

| Ex. | MFI in g/10 min | Density in g/cm³ | $M_w/M_n$ | Bulk density in g/l | Eta value in dl/g | Mean particle diameter in mm | Cold heptane extract in % by weight |
|---|---|---|---|---|---|---|---|
| 18 | 1.3 | 0.928 | 5.3 | 350 | 2.0 | 0.78 | 1.8 |
| 19 | 0.8 | 0.919 | 5.4 | 360 | 2.1 | 0.77 | 1.9 |
| 20 | 1.1 | 0.928 | 5.3 | 410 | 2.0 | 0.73 | 0.4 |

The invention claimed is:

1. A process for preparing catalyst systems of the Ziegler-Natta type, consisting of the following steps:
   A) bringing an inorganic metal oxide into contact with an organometallic compound of group 3 of the Periodic Table,
   B) bringing the intermediate obtained from step A) or the treated inorganic metal oxide of step A) into contact with a magnesium compound $MgR^1{}_nX^1{}_{2-n}$, where
      $X^1$ are each, independently of one another, fluorine, chlorine, bromine, iodine, hydrogen, $NR^x{}_2$, $OR^x$, $SR^x$, $SO_3R^x$ or $OC(O)R^x$,
      $R^1$ and $R^x$ are each, independently of one another, a linear, branched or cyclic $C_1$–$C_{20}$-alkyl, a $C_2$–$C_{10}$-alkenyl, an alkylaryl having 1–10 carbon atoms in the alkyl part and 6–20 carbon atoms in the aryl part or a $C_6$–$C_{18}$-aryl and
      n is 1 or 2,
   and subsequently,
   C) bringing the intermediate obtained from step B) into contact with a halogenating reagent,
   D) bringing the intermediate obtained from step C) into contact with an alcohol of the formula $R^2$—OH, where $R^2$ is a linear, branched or cyclic $C_1$–$C_{20}$-alkyl a $C_2$–$C_{10}$-alkenyl, an alkylaryl having 1–10 carbon atoms in the alkyl part and 6–20 carbon atoms in the aryl part or a $C_6$–$C_{18}$-aryl, E) bringing the intermediate obtained from step D) into contact with a tetravalent titanium compound and F) optionally, bringing the intermediate obtained from step E) into contact with a donor compound.

2. A process for preparing catalyst systems as claimed in claim 1, wherein a magnesium compound MgR$^{12}$ is used in step B).

3. A process for preparing catalyst systems as claimed in claim 1, wherein chloroform is used as halogenating reagent in step C).

4. A process for preparing catalyst systems as claimed in claim 1, wherein a silica gel is used as inorganic metal oxide in step A).

5. A process for preparing catalyst system as claimed in claim 1, wherein titanium tetrachloride is used as tetravalent titanium compound in step E).

6. A process for preparing catalyst systems as claimed in claim 1, wherein the organometallic compound of group 3 of the Periodic Table used in step A) is an aluminum compound AlR$_m$X$_{3-m}$, where X are each, independently of one another, fluorine, chlorine, bromine, iodine, hydrogen, NR$^x_2$, OR$^x$, SR$^x$, SO$^3$R$^x$ or OC(O)R$^x$, and R and R$^x$ are each, independently of one another, a linear, branched or cyclic C$_1$–C$_{20}$-alkyl, a C$_2$–C$_{10}$-alkenyl, an alkylaryl having 1–10 carbon atoms in the alkyl part and 6–20 carbon atoms in the aryl part or a C$_6$–C$_{18}$-aryl and m is 1, 2 or 3.

7. A process for preparing catalyst systems as claimed in claim 1, wherein the donor compound in step E) contains at least one nitrogen atom.

8. A process for the polymerization or copolymerization of olefins at from 20 to 150° C. and pressures of from 1 to 100 bar, wherein the polymerization or copolymerization is carried out in the presence of at least one catalyst system of the Ziegler-Natta type prepared by the process of claim 1 and optionally an aluminum compound as cocatalyst.

9. A process for the polymerization or copolymerization of olefins as claimed in claim 8, wherein a trialkylaluminum compound whose alkyl groups each have from 1 to 15 carbon atoms is used as aluminum compound.

10. A process for the polymerization or copolymerization of olefins as claimed in claim 8, wherein ethylene mixtures of ethylene and C$_3$–C$_8$-α-monoolefins are (co)-polymerized.

11. A process for preparing catalyst systems of the Ziegler-Natta type, consisting essentially of the following steps:

A) bringing an inorganic metal oxide into contact with an organometallic compound of group 3 of the Periodic Table, B) bringing the intermediate obtained from step A) or the treated inorganic metal oxide of step A) into contact with a magnesium compound MgR$^1_n$X$^1_{2-n}$, where X$^1$ are each, independently of one another, fluorine, chlorine, bromine, iodine, hydrogen, NR$^x_z$, OR$^x$, SR$^x$, SO$_3$R$^x$ or OC(O)R$^x$, R$^1$ and R$^x$ are each, independently of one another, a linear, branched or cyclic C$_1$–C$_{20}$-alkyl, a C$_2$–C$_{10}$-alkenyl, an alkylaryl having 1–10 carbon atoms in the alkyl part and 6–20 carbon atoms in the aryl part or a C$_6$–C$_{18}$-aryl and n is 1 or 2, and subsequently, C) bringing the intermediate obtained from step B) into contact with a halogenating reagent, D) bringing the intermediate obtained from step C) into contact with an alcohol of the formula R$^2$—OH, where R$^2$ is a linear, branched or cyclic C$_1$–C$_{20}$-alkyl a C$_2$–C$_{10}$-alkenyl, an alkylaryl having 1–10 carbon atoms in the alkyl part and 6–20 carbon atoms in the aryl part or a C$_6$–C$_{18}$-aryl, E) bringing the intermediate obtained from step D) into contact with a tetravalent titanium compound and F) optionally, bringing the intermediate obtained from step E) into contact with a donor compound.

* * * * *